(12) United States Patent
Laaksonen (10) Patent No.: US 9,980,078 B2
(45) Date of Patent: May 22, 2018

(54) AUDIO OBJECT MODIFICATION IN FREE-VIEWPOINT RENDERING

(71) Applicant: Nokia Technologies Oy, Espoo (FI)

(72) Inventor: Lasse Juhani Laaksonen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days. days.

(21) Appl. No.: 15/293,607

(22) Filed: Oct. 14, 2016

(65) Prior Publication Data

US 2018/0109901 A1  Apr. 19, 2018

(51) Int. Cl.
*H04S 7/00* (2006.01)
*G06F 3/01* (2006.01)

(52) U.S. Cl.
CPC .............. *H04S 7/304* (2013.01); *G06F 3/012* (2013.01); *H04S 2400/11* (2013.01)

(58) Field of Classification Search
CPC .......... H04S 7/303; H04S 7/304; H04S 1/005; H04R 3/12; H04R 5/02; G06F 3/165; G06F 3/102
USPC .................................... 381/310, 313, 17, 61
See application file for complete search history.

(56) References Cited

U.S. PATENT DOCUMENTS

| 6,330,486 B1 | 12/2001 | Padula ............................. 700/94 |
| 7,266,207 B2 | 9/2007 | Wilcock et al. |
| 9,179,232 B2 | 11/2015 | Jarske et al. |
| 2006/0025216 A1 | 2/2006 | Smith ............................. 463/35 |
| 2010/0119072 A1 | 5/2010 | Ojanpera |
| 2010/0208905 A1 | 8/2010 | Franck et al. |
| 2012/0232910 A1 | 9/2012 | Dressler et al. .............. 704/500 |
| 2013/0114819 A1 | 5/2013 | Melchior et al. |
| 2013/0321586 A1 | 12/2013 | Kirk et al. |
| 2014/0010391 A1 | 1/2014 | Ek et al. |
| 2014/0285312 A1 | 9/2014 | Laaksonen et al. |
| 2014/0328505 A1* | 11/2014 | Heinemann ............. H04S 7/303 381/303 |
| 2014/0350944 A1 | 11/2014 | Jot et al. |
| 2015/0055937 A1 | 2/2015 | Van Hoff et al. .............. 386/285 |
| 2015/0116316 A1 | 4/2015 | Fitzgerald et al. ........... 345/419 |
| 2015/0302651 A1* | 10/2015 | Shpigelman .......... G06T 19/006 345/633 |
| 2015/0316640 A1 | 11/2015 | Jarske et al. |
| 2016/0125867 A1 | 5/2016 | Jarvinen et al. |
| 2016/0142830 A1 | 5/2016 | Hu |

(Continued)

FOREIGN PATENT DOCUMENTS

| EP | 2 688 318 A1 | 1/2014 |
| WO | 2011/020067 A1 | 2/2011 |

(Continued)

OTHER PUBLICATIONS

Hatala, Marek et al., "Ontology-Based User Modeling in an Augmented Audio Reality System for Museums", http://citeseerx.ist.psu.edu/viewdoc/download?doi=10.1.91.5712&rep=rep1&type=pdf, Aug. 29, 2016, 38 pgs.

(Continued)

*Primary Examiner* — Melur Ramakrishnaiah
(74) *Attorney, Agent, or Firm* — Harrington & Smith (57) ABSTRACT

A method including, during a free-viewpoint rendering to a user, where the free-viewpoint rendering comprises rendering of an audio object, and during relative movement between a location of the user and the audio object in the free-viewpoint rendering, detecting a locational conflict abnormality between the audio object and the location of the user; and based upon the detecting of the locational conflict abnormality, changing the rendering of the audio object, where the changing is based upon at least one predetermined abnormality modification parameter.

24 Claims, 8 Drawing Sheets

(56) References Cited

U.S. PATENT DOCUMENTS

| | | |
|---|---|---|
| 2016/0150267 A1 | 5/2016 | Strong |
| 2016/0150345 A1 | 5/2016 | Jang |
| 2016/0212272 A1 | 7/2016 | Srinivasan et al. |
| 2016/0266865 A1 | 9/2016 | Tsingos et al. |
| 2016/0300577 A1 | 10/2016 | Fersch et al. |
| 2017/0165575 A1 | 6/2017 | Ridihalgh et al. |
| 2017/0169613 A1 | 6/2017 | VanBlon et al. |
| 2017/0230760 A1 | 8/2017 | Sanger et al. |
| 2017/0366914 A1 | 12/2017 | Stein et al. |

FOREIGN PATENT DOCUMENTS

| | | |
|---|---|---|
| WO | 2015/152661 A1 | 10/2015 |
| WO | WO-2016014254 A1 | 1/2016 |

OTHER PUBLICATIONS

Gunel, Banu et al., "Spatial Synchronization of Audiovisual Objects by 3D Audio Object Coding", IEEE 2010, pp. 460-465; https://www.researchgate.net/profile/E_Ekmekcioglu/publication/251975482_Spatial_synchronization_of_audiovisual_objects_by_3D_audio_object_coding/links/54e783660cf2f7aa4d4d858a.pdf>; 2010.

"Unity 3D Audio"; Nov. 8, 2011; whole document (9 pages).

Wozniewski, M. et al.; "User-Specific Audio Rendering and Steerable Sound for Distributed Virtual Environments"; Proceedings of the 13th International Conference on Auditory Display; Montréal, Canada; Jun. 26-29, 2007; whole document (4 pages).

\* cited by examiner

AUDIO OBJECT MODIFICATION IN FREE-VIEWPOINT RENDERING

BACKGROUND

Technical Field

The exemplary and non-limiting embodiments relate generally to an audio object and, more particularly, to modifying an audio object.

Brief Description of Prior Developments

Free-viewpoint, in an audiovisual consumption, refers to a user being able to move in the content consumption space. A non-free viewpoint virtual reality experience is limited to changing the direction of the viewpoint (rotation), but free-viewpoint rendering allows changing the point of rendering via moving (translation) as well as changing the direction of the viewpoint (rotation). Providing an audio object in free-viewpoint rendering is known. For free-viewpoint rendering, the geometric transformation, thus, includes 3D rotation and 2D translation or 3D translation.

SUMMARY

The following summary is merely intended to be exemplary. The summary is not intended to limit the scope of the claims.

In accordance with one aspect, an example method comprises, during a free-viewpoint rendering to a user, where the free-viewpoint rendering comprises rendering of an audio object, and during relative movement between a location of the user and the audio object in the free-viewpoint rendering, detecting a locational conflict abnormality between the audio object and the location of the user; and based upon the detecting of the locational conflict abnormality, changing the rendering of the audio object, where the changing is based upon at least one predetermined abnormality modification parameter.

In accordance with another aspect, an example apparatus comprises at least one processor; and at least one non-transitory memory including computer program code, the at least one memory and the computer program code configured to, with the at least one processor, cause the apparatus to: during a free-viewpoint rendering to a user, where the free-viewpoint rendering comprises a rendering of an audio object, and during relative movement between a location of the user and the audio object in the free-viewpoint rendering, detect a locational conflict abnormality between the audio object and the location of the user; and based upon the detecting of the locational conflict abnormality, change the rendering of the audio object, where the changing is based upon at least one predetermined abnormality modification parameter.

In accordance with another aspect, an example apparatus comprises a non-transitory program storage device readable by a machine, tangibly embodying a program of instructions executable by the machine for performing operations, the operations comprising: during a free-viewpoint rendering to a user, where the free-viewpoint rendering comprises a rendering of an audio object, and during relative movement between a location of the user and the audio object in the free-viewpoint rendering, detecting a locational conflict abnormality between the audio object and the location of the user; and based upon the detecting of the locational conflict abnormality, changing the rendering of the audio object, where the changing is based upon at least one predetermined abnormality modification parameter.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
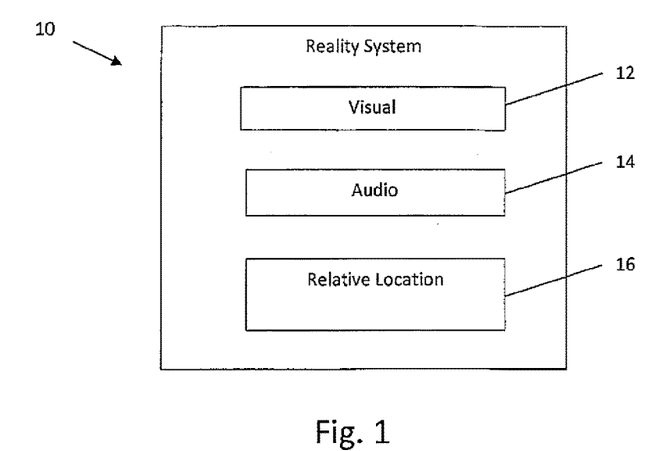
FIG. 1 is a diagram illustrating a reality system comprising features of an example embodiment.

Referring to FIG. 1, a diagram is shown illustrating a reality system 10 incorporating features of an example embodiment. The reality system 10 may be used by a user for augmented-reality (AR), virtual-reality (VR), or presence-captured (PC) experiences and content consumption, for example. Although the features will be described with reference to the example embodiments shown in the drawings, it should be understood that features can be embodied in many alternate forms of embodiments.

The system 10 is configured to provide a free-viewpoint rendering to the user. The system 10 generally comprises a visual system 12, an audio system 14 and a relative location system 16. The visual system 12 is configured to provide visual images to a user. For example, the visual system 12 may comprise a virtual reality (VR) headset, goggles or glasses. The audio system 14 is configured to provide audio sound to the user, such as by one or more speakers, a VR headset, or ear buds for example. The relative location system 16 is configured to sense a location of the user, such as the user's head for example, and determine the location of the user in the realm of the reality content consumption space. The movement in the reality content consumption space may be based on actual user movement, user-controlled movement, and/or some other externally-controlled movement or predetermined movement, or any combination of these. The user is able to move in the content consumption space of the free-viewpoint. The relative location system 16 may be able to change what the user sees and hears based upon the user's movement in the real-world; that real-world movement changing what the user sees and hears in the free-viewpoint rendering.

Figure 2:
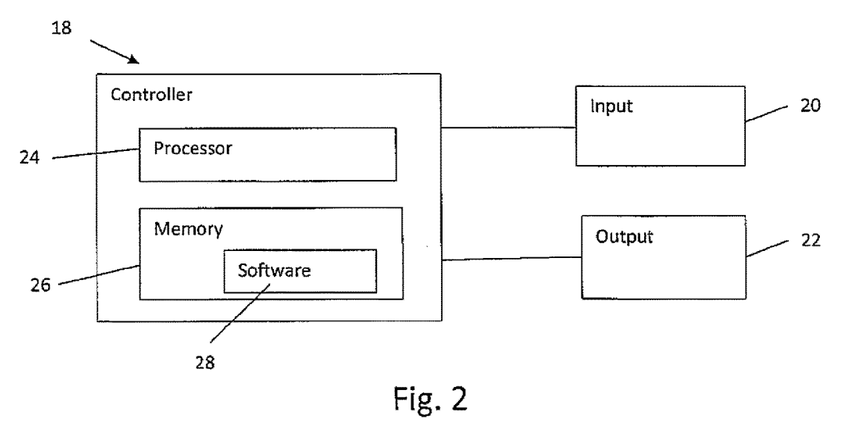
FIG. 2 is a diagram illustrating some components of the system shown in FIG. 1.

Referring also to FIG. 2, the reality system 10 generally comprises one or more controllers 18, one or more inputs 20 and one or more outputs 22. The input(s) 20 may comprise, for example, location sensors of the relative location system 16, reality information from another device, such as over the Internet for example, or any other suitable device for inputting information into the system 10. The output(s) 22 may comprise, for example, a display on a VR headset of the visual system 12, speakers of the audio system 14, and a communications output to communication information to another device. The controller(s) 18 may comprise one or more processors 24 and one or more memory 26 having software 28.

Figure 3:
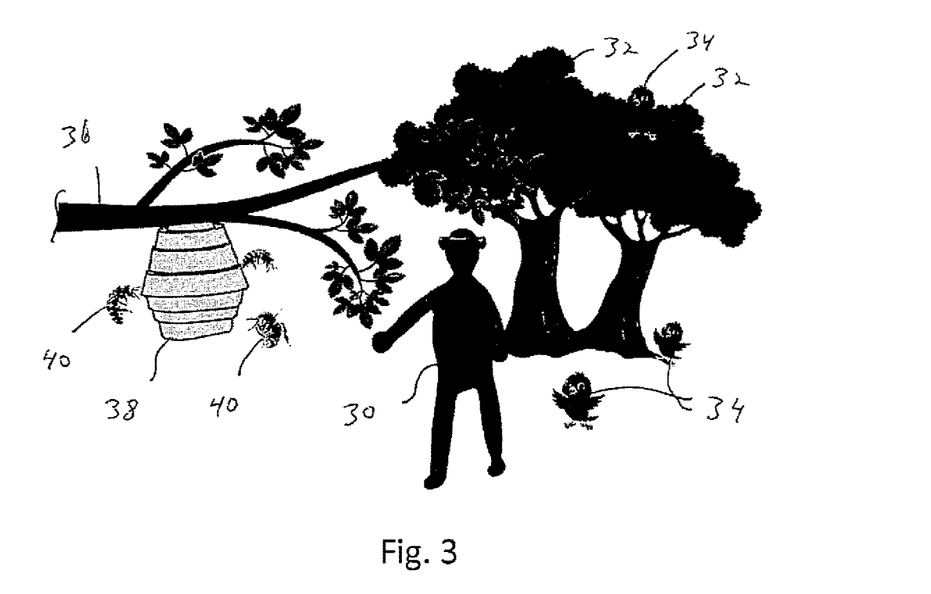
FIG. 3 is an example illustration of a virtual reality realm from a third-person perspective.

Referring also to FIG. 3, a snapshot of a free-viewpoint mediated reality experience is shown. In this example, the experience includes trees 32, birds 34, and a tree branch 36 having a bee hive 38 and bees 40. FIG. 3 illustrates a user experiencing a free-viewpoint video and audio. The illustration features a user, depicted in a real space wearing a Head Mounted Display (HMD) and headphones combination; surrounded by the mediated reality experience. In other words, FIG. 3 presents a third-person view combining the user and the mediated reality space the user currently experiences. The location of the user in the experience is illustrated by 30. The mediated reality space consists of a video representation of a real space with audio-object sound sources 32, 34, 38, 40. In this example, the user experiences a nature scene, where he sees and hears birds singing around him and bees buzzing around their hive in front of the user.

Figure 4:
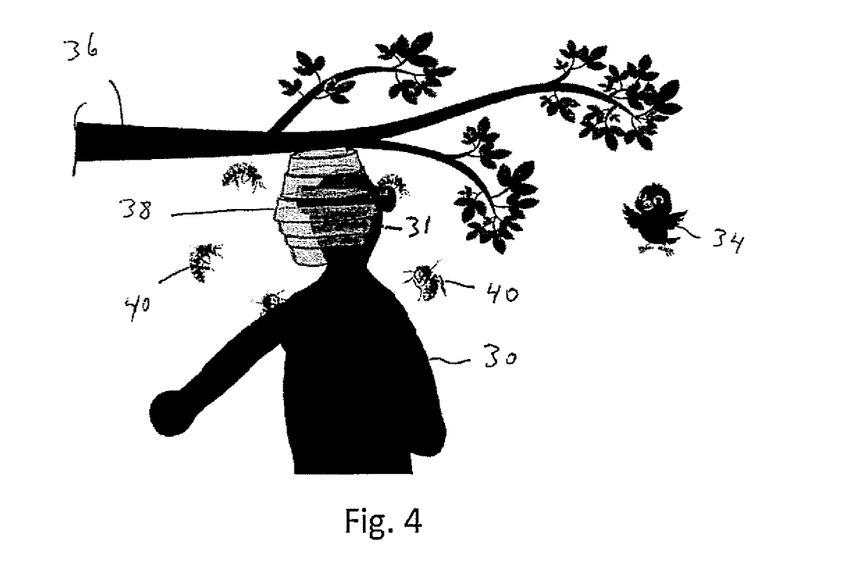
FIG. 4 is an illustration similar to FIG. 3 shown an example of a locational conflict abnormality between the audio object and the location of the user in the free-viewpoint rendering.

Referring also to FIG. 4, this illustrates a user having moved from the position shown in FIG. 3 in the mediated reality experience to a new location. However, in this new location shown in FIG. 4 the user has moved into or through an audio object or source; namely, the head 31 of the user 30 is shown inside the bee hive 38. This illustrates a locational conflict abnormality between the audio object 38 and the location of the user in the free-viewpoint rendering. In the real-world a head of a person could not be in a bee hive; not without destroying the bee hive. The head inside the bee hive example shown in the drawings is merely one example of a locational conflict abnormality. Another example might be, for example, a user being close to a furnace where the heat from the furnace at that location would exceed what a person in real life could survive. The audio object of the sound of the furnace could be modified, based upon one or more parameters, based upon this locational conflict abnormality. The audio object modification may also apply to any audio object interaction; not necessarily limited to those that would be impossible, dangerous or uncomfortable in the real world.

Features as described herein may be used for a new audio-object interaction detection and definition for improved user experience of free-viewpoint audio. Features may be used, for example, with augmented-reality (AR), virtual-reality (VR), and presence-captured (PC) experiences and content consumption. In particular, the features may be used with spatial audio, such as object-based audio, and user interactions and user interfaces.

With free-viewpoint in audiovisual consumption a user may move, for example, continuously or in discreet steps in an area around the point corresponding to capture (such as the position of a NOKIA OZO device) or, for example, between at least two such capture points. The user may perceive the audiovisual scene in a natural way at each direction at each location in the allowed area of movement. When at least some part of the experience is simulated, such as by means of computer-generated additional effects or modifications of the captured audiovisual information for example, such experiences may be referred to using an umbrella term "mediated reality experience". The content may be captured (thus corresponding to perceived reality), computer-generated, or combination of the two. It may be pre-recorded or pre-generated or, for example, live footage. The captured content and data may include, for example, spatial audio and video, point clouds, and geo-location data which may be obtained by means of radio-frequency (RF) tracking for example. RF tracking may be based on HAIP technology (high-accuracy indoor positioning) for example. An audio object may be captured or generated.

As noted above with respect to FIGS. 3-4, a user of a free-viewpoint mediated reality experience may consume video content using a head-mounted display (HMD) and associated audio content using headphones. At least one component in the system may track the user's head movement allowing for the "correct part" of the video being shown to the user from a correct viewpoint and for the audio objects or sources to similarly appear in their correct positions relative to the user's position and orientation in the consumption space. The user may move in the real space with the user movement corresponding directly or relatively to perceived movement in the mediated reality space. On the other hand, the user may also control his movement in the space via a user interface, or there may in some cases be a pre-programmed movement or a movement controlled by a third party (such as a control person or a service). A similar effect may, in some cases, be achieved by real movement of the capture device in the real space.

As seen in FIG. 4, a free-viewpoint rendering may allow for the user to "connect physically" with an audio source in their captured positions or default rendering positions. "Default" may be in the sense that the position is time-varying, but it is the intended position at the given time instance. The beginning and extent, as well as the response, of this audio interaction have been generally unspecified. It seems any default response to this connect or interaction may be preferable only for a subset of audio objects and use cases. Previously, what has been lacking is a common framework for audio object interactivity in free-viewpoint rendering. Thus, answers to questions addressed herein include such as: What is an interaction with an audio object in free viewpoint audio? How can the interaction be detected? When and where does the interaction begin, and when and where does it end? In other words, what is its extent?

Figures 5A, 5B:
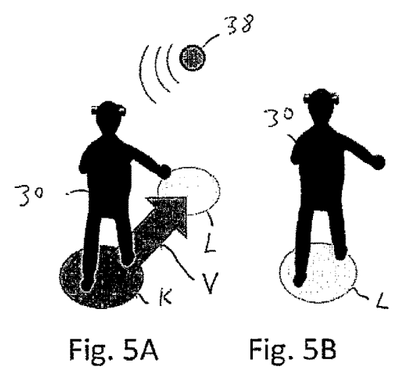
FIGS. 5A-5D illustrate different results for locational conflict abnormalities between the audio object and the location of the user in the free-viewpoint rendering.

Referring also to FIG. 5A, this presents an illustration of the user 30 coming into contact with the audio object 38 when the user moves from the location K to location L in the "rendering". There may be a natural audio response that also corresponds with what the user sees. The user (with the user's head wearing headphones) is illustrated moving to the default location of the audio object 38. Thus, when the position of the rendering to the user overlaps with the audio object 38, how the audio object is rendered to the user in view of this locational conflict abnormality may be addressed. There are possible default responses that may be considered.

With features as described herein, the locational conflict abnormality interaction and response to the interaction may be defined for a high-quality free-viewpoint audio experience. The content creator point of view may also be taken into account. By providing flexibility, there may be many different rendering options that cover many different use cases. In addition, it may be possible to provide information about what the optimal or desired rendering option is for a given audio object. In other words, production tools may be expected to take this into account. These solutions are currently lacking in conventional systems, and a common framework may be defined with use of features described herein.

Features as described herein may be used for a parameterized object-audio interaction for free-viewpoint mediated reality experiences. Interaction may be defined as rendering for an audio object as a function of rendering position in the free-viewpoint audio. This may be implemented, for example, through defining a set of parameters that may be stored and transmitted as audio-object metadata. Alternatively, such metadata may refer to a channel, a track, or, for example, a set of directional audio sub-band components or parameters.

Figure 6:
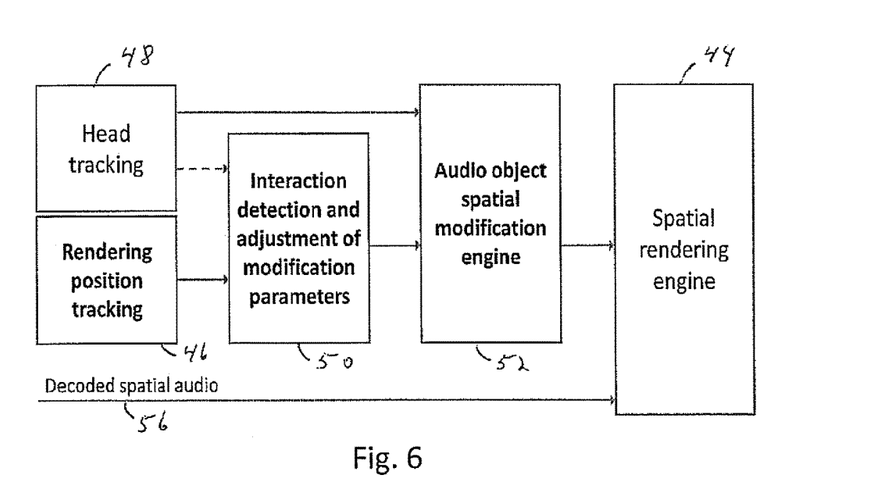
FIG. 6 is a diagram illustrating some components of the system shown in FIGS. 1-2.

The overall system may further include an interface for setting up the parameters or a subset of them for an audio object, channel, track, etc. This interface may appear as part of a spatial audio production software. Furthermore, the system may feature an enhanced spatial renderer, or a modifier block prior to a spatial renderer, which modifies the audio object or audio objects according to a detected user interaction with the audio object or audio objects. FIG. 6 presents a block diagram of some features of an example embodiment.

The user interaction and detection of that interaction may be based on at least the current "position of the rendering", such as including K or L for example, in relation to the position of the audio object. It may also take into account the movement vector V such as, for example, the previous "position of the rendering" or the change in "position of the rendering". In some further embodiments, a prediction of the next "position of the rendering" may also be used. This behavior may be reflected through a secondary parameter. Here, the "position of the rendering" refers to the viewpoint of the user in the mediated reality. This position/viewpoint may change in the free-viewpoint mediated reality experience such as, for example, according to the description above.

In further embodiments, the concept of user-to-audio-object interaction may include analysis about the user movement and action beyond the user's position or viewpoint in the mediated reality space. For example, a user may interact with an audio object by manipulating it with their hands or a set of application controllers. Various object-manipulation techniques for VR are known. These apply as a means for user input. The response is specified by the techniques with features as described herein. The response may be divided into two categories: the first category relates to 'Interaction detection and adjustment of modification parameters', while the second category relates to 'Audio object spatial modification'.

In some advanced embodiments, such as where multi-user content consumption is supported, a common rendering of an audio object based on user interaction may be utilized. In other words, at least two users may simultaneously consume the same mediated reality experience. Typically, the audio rendering for each user would be independent of what is rendered for the other user(s). If common rendering is utilized, a modification to the rendering of one user may be reflected in the corresponding rendering of a second user. This may allow for new types of playful, game-like audio object renderings and experiences.

Figure 7:
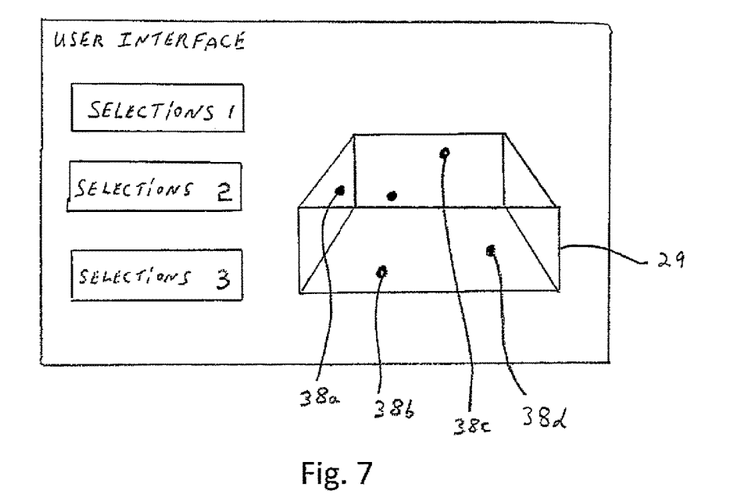
FIG. 7 is an example of a user interface for programming features of an example embodiment.

A minimum set of properties or characteristics of an audio object relating to how the object is rendered may be the audio track and the object's location in the "rendered" space. Typically a size property would also be used. This could be used for indicating how many speakers in a speaker setup would be rendering the audio object based on its current location for example. For example, an audio object corresponding to a helicopter may be mixed to hover at a certain distance over the user and then fly away to user's front right. In practice, the audio track corresponding to the helicopter is accordingly panned through the most appropriate speakers (or whatever is the user's setup) during the rendering. Referring to FIG. 6, this step may be performed by the box 44 on the right-hand side; the Spatial rendering engine. FIG. 7 presents an example visualization of mixing in context of DOLBY ATMOS for example. This visualization of mixing may be adapted to program the abnormality modification parameters and modification adjustment parameters (such as effective distance and reversibility, for example, described below). Individual audio sources, such as $38a$-$38d$ for example, in the content consumption space 29 may be programmed to have separate modification parameters for individualized responses which are perhaps different from one another. This is merely an example and should not be considered as limiting. In some examples, the interface could allow two or more audio sources, such as $38a$ and $38b$ for example, to be set with common modification parameters at a same time, such as based upon a common audio object "type" classification for example. This may speed up setting of the parameters at the interface.

The audio track of an audio object may be a monophonic track, a stereo track, or a multi-channel track. Furthermore, the audio track may include additional metadata for spatial reproduction. Some form of spatial track is preferred for high-quality rendering. However, a mono audio track may also be utilized. In more advanced embodiments, there may be additional properties which are also consider here. Such additionally properties may include, for example, direction and directiveness of an audio source.

In FIG. 6, 'Rendering position tracking' 46 refers to tracking of the user position or viewpoint. This may be combined with the headtracking 48 functionality. Conventional tracking system(s) may be used for the tracking 46, 48. Interaction detection defines when audio object rendering should be modified. In addition, the extent to which modification should be performed may be defined. Interaction may be detected based on the position of the rendering, the location of the audio object, and an umbrella parameter referred to as an 'Effective distance' parameter. This 'Effective distance' parameter is described in more detail below. In addition, the size of the audio object may be considered in interaction detection. However, depending on implementation, this information may be considered by the 'Effective distance' parameter. Furthermore, an input on size of the position of the rendering may be used. However, this information may be omitted and an assumption on human head size may be used. A headtracking input, for example head orientation information, may also be used.

As noted above, features as described herein may be used with an interaction detection and interaction parameter modification for free-viewpoint mediated reality experiences. The overall system may consist of a set of parameters that defines when a user interacts with an audio object and how a user interacting with an audio object affects the state and rendering of the audio object. The parameters may be implemented as metadata allowing among other things for backwards interoperability with existing or less capable renderers. Interoperability in this case means that the new features provided by the new system described herein are then not available, and a legacy system may work in a way it was originally intended without hiccups caused by the additions. Features as described herein, thus, solve the problem of detecting an, interaction with an audio object in free-viewpoint audio and selecting the parameters which affect modification of the audio object properties in the context of this interaction.

As seen in FIG. 6, results from the head tracking 48 and rendering position tracking 46 may be used for the interaction detection and adjustment of modification parameters as indicated by block 50. The interaction detection and adjustment of modification parameters 50 and the output from the head tracking 48 may be used as input for the audio object modification engine 52. This engine 52, comprising at least one processor and at least one memory including computer code, may then generate an output to be used by the spatial rendering engine 44 (comprising at least one processor and at least one memory including computer code). Decoded spatial audio 56 may also be used as input for the spatial rendering engine 44.

Figure 8:
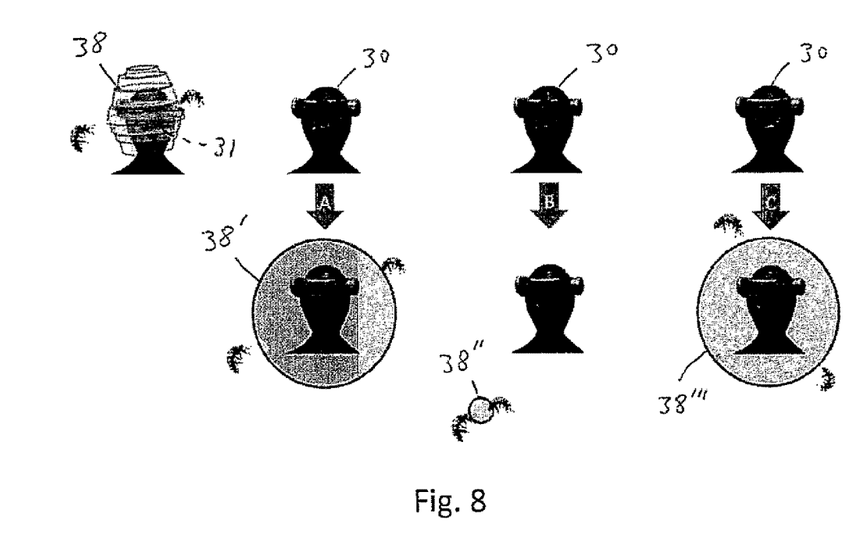
FIG. 8 illustrates some examples for treating the locational conflict abnormality shown in FIG. 4.

Four possible basic modification parameters may comprise location, scale, rotation and amplification. FIG. 8 will be referred to for illustrating them with some examples. The location parameter may define a location modification (in X-Y-Z) for the audio object 38. This may be used, for example, to move the audio object away from the user/ position of the rendering. The scaling parameter defines a size modification (in X-Y-Z) for the audio object 38. Thus, the scaling may also alter the shape of the audio object. The scaling may be used, for example, to enlarge the audio object for surrounding the user (or user's head 31) with the audio object. The rotation parameter may define a rotation modification (around X-Y-Z) for the audio object 38. This may be useful, for example, if the audio object features directivity or a spatial audio track. The amplification parameter may define the volume of the audio object 38 relative to its original volume. This may typically be time-varying. For example, an interaction at a specific time may mute the audio object, while an interaction at another time may not have any effect to volume.

FIG. 8 illustrates three interaction modifications and the resulting renderings of the audio object 38 with the locational conflict abnormality shown in FIG. 4. As illustrated with arrow A, the size of the original audio object 38 may be modified to externalize the audio object as shown by 38' relative to the user's head 31 (the size may affect, for example, which speakers will contribute to the sound reproduction or sound volume). As illustrated with arrow B, the location may be modified to distance the audio object from the point of rendering as illustrated by 38" (the location will affect the direction from which the sound is reproduced). As illustrated with arrow C, both the size and rotation may be modified, and the audio object is thus both externalized and it is spinning around the user as illustrated by 38''' (the spinning assumes at least a stereo track or alternatively some artificial spatial processing).

Additional parameters may define more advanced responses that provide additional freedom in designing the experience. These may include, for example, equalization, directiveness and time shift. The equalization parameter may define a frequency-dependent modification for the audio object's audio track playback level. While the audio object may have a directiveness property, the directivity of the audio object may be further modified according to a directiveness parameter. This directiveness parameter may define, for example, a sector shape, size, and direction for the playback of the audio object's audio track. It may be frequency dependent. Directiveness may be a secondary parameter for the Equalization parameter. The time shift parameter may define a modification to the playback time code for the audio object's audio track. It may be, for example, a relative or an absolute time shift. Thus, a user interaction may, for example, trigger or "rewind" an audio track. Further advanced parameters may, for example, make the audio object follow the user that has come in contact with it (a 'Stickiness' parameter) or multiply an audio object or its audio track (an 'Object multiplication' parameter). These advanced parameters in particular may enable multi-user interactivity and new playful experiences in (new) free-viewpoint mediated reality experiences. In addition, there may be a parameter indicating a specific response (such as use of a decorrelation filter for improved externalization).

Figure 9:
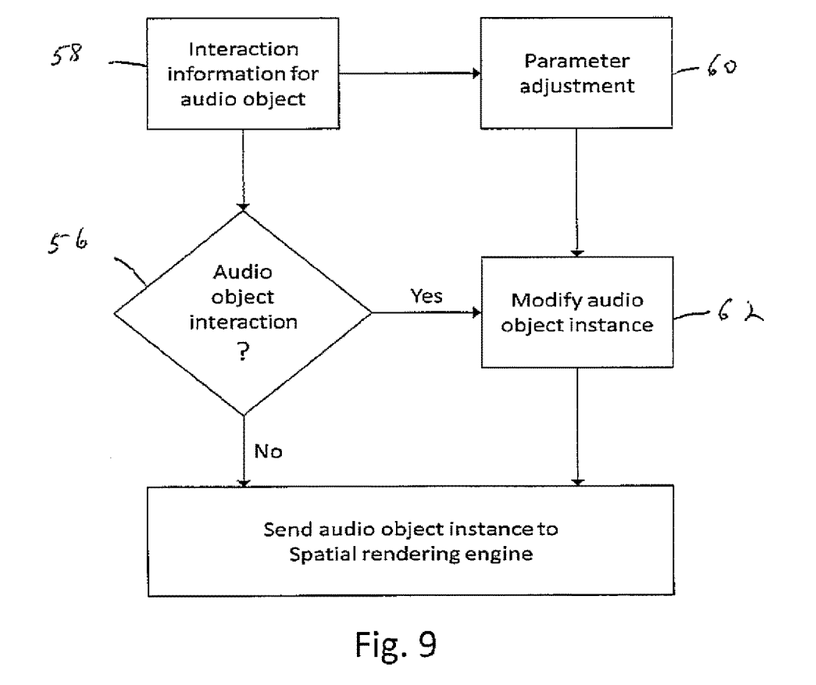
FIG. 9 is a diagram illustrating an example method.

The spatial audio rendering engine 44 (see FIG. 6) receives audio objects as well as the basic mix (or so-called bed audio, where available) and renders the spatial audio at the point of the rendering. Referring also to FIG. 9, here we assume the spatial audio rendering engine 44 receives at least one modified audio object instance. This modification is based on a detected interaction 56 and a parameter set that has been defined for the audio object. As explained below, at least one parameter may define "when" the audio object will respond to the interaction. And as explained above, at least one parameter may define "how" the audio object will respond to the interaction. FIG. 9 presents the process of modifying the audio object in the audio object spatial modification engine. In some embodiments, this process may also be part of the spatial rendering engine 44. Interaction information for the audio object is obtained as indicated by 58, and corresponding adjustment of the modification parameters is performed for the audio objects as indicated by 60. If audio object interaction is detected, such as a locational conflict abnormality for example, at least one of the modification parameters may be applied as indicated by block 62. The spatial rendering engine 44 may then perform its rendering of the modified audio object.

The modification applied to the audio object may depend on the audio object properties, such as the type of the audio track for example. For example, a mono track may be processed as necessary by a decorrelator to improve the signal's externalization (upmix from mono to stereo). The spatial rendering engine 44 may treat the modified audio object instance like any other audio object. Assuming sensible parameter choices were made when the experience was designed and mixed, the resulting rendering under audio object interaction will be improved.

Figure 5C:
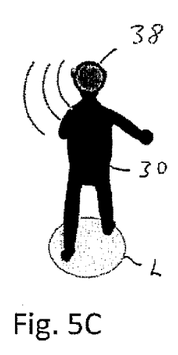
Figure 5D:
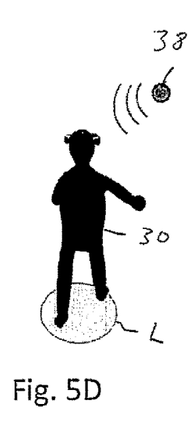

Referring also to FIGS. 5B-5D, these figures present an illustration of further example responses that a renderer could independently perform in the problem case of FIG. 4. As illustrated by FIG. 5B, an audio source 38 may be silenced when a user 30 goes into it. This solution avoids annoying effects that other solutions may have, but it may not be very realistic or otherwise desirable for the overall use case. As illustrated by FIG. 5C, an audio source 38 may continue to be rendered as if nothing had happened; with the audio source thus appearing within the user's head. This may be annoying and unrealistic, and it may get particularly bad with small movements (of the user and/or the audio object alike) that may cause the rendered audio sound like the audio objects travel back and forth through the users head. As illustrated in FIG. 5D, an audio source 38 may evade the user, i.e., a distance (such as relative to a position or an absolute distance) may be kept between the user and the audio source. This solution may be unrealistic and unsuitable in some use cases, however it may appear natural particularly in a case where the audio object creates ambiance and does not correspond to any visible object.

In the case of FIG. 5B, the beehive or the individual bees stop making noise. Clearly this seems like an awkward user experience. However, it may correspond to what the user would be seeing. Should the rendering of FIG. 5B be used, the rendering may be realistic depending on the actual audio objects. If there are individual bee objects or the object is made up of several parts, the rendering may correspond to bees buzzing around the user. However, should the audio object be a single hive, the buzzing will locate inside the user's head. This may be unpleasant. The rendering according to FIG. 5B may work depending on the exact implementation details. However, it may also appear highly unrealistic and disturbing. Again, it will not likely correspond to the visual experience. Thus, unlike the examples of FIGS. 5B-5D, the parameterized modifications described above may provide a more natural or understandable response. The parameterized interactions as shown in FIG. 8 may also be used to easily achieve each of the responses in FIG. 5 in a controlled way.

It seems that better flexibility should be possible, and very importantly the content creator point of view may be taken into account; in order to achieve as good a user experience as possible in the context of audio-object rendering under user interactions. For flexibility, there may be many different rendering options that cover as many use cases as possible. In addition, it may be possible to provide information about what the optimal or desired rendering option is for a given audio object. In other words, production tools may be provided to take into account the type of audio object involved; different modification parameters for different types of audio objects.

Features as described herein enable for natural responses in free-viewpoint audio. Features as described herein provide new exciting user experiences in free-viewpoint audio, including game-like interactions, e.g., in some multi-user contexts. Features as described herein allow for intuitive user interaction with various different audio objects with predictable output. Features as described herein enable new tools and opportunities in content creation leading to above advantages and content differentiation. This may be implemented as metadata, which in turn potentially enables renderer differentiation in the marketplace while enabling backwards "compatibility" (i.e., a legacy renderer may ignore the metadata and simply not provide the new functionality). Furthermore, aspects of the system may be utilized, for example, in MPEG or 3GPP standards that support free-viewpoint audio.

As noted above, additional parameters may be used for adjusting the modification parameters. These addition parameters may be considered modification adjustment parameters. Interaction detection may be based on a distance calculation, where the X-Y-Z coordinates of two key components (the position of rendering and the location of audio object) are known. A threshold value derived from their size information may define whether the user intersects the audio object in space. Furthermore, an 'Effective distance' parameter may define whether the interaction begins at a different distance than this point of actual intersection.

In advanced embodiments, the shape of the user (or point of the rendering) as well as the audio object may be known and used in the above calculation. However, in practice, considering the actual shape of the user may add significant computational complexity without any substantial change or improvement in rendering. For some users, the implied change of the filtering relating to the head-related transfer function (HRTF) may be perceptually significant. The parameter set for the shape of the audio object may also be taken into account. A separate definition may be needed for the shape of the user/point of the rendering.

Effective Distance

Figure 10:
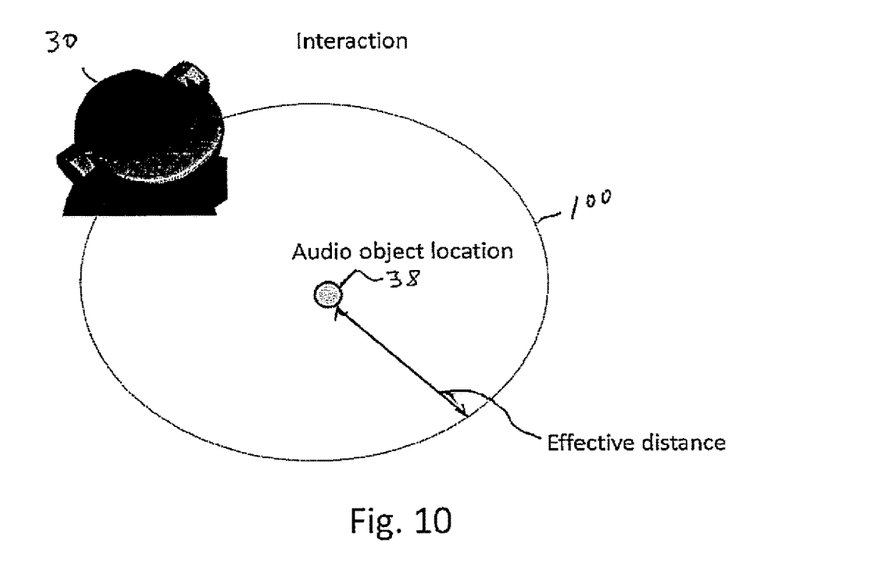
FIG. 10 is a diagram illustrating an example of an effective distance parameter.

An effective distance parameter, even though considered a modification adjustment parameter, may be a core parameter that defines the distance from which user interaction is considered for the current audio object. An example of the effective distance is illustrated in FIG. 10. The effective distance parameter defines a distance from which the effects of one or more other parameters may be considered. In other words, the parameter defines a "force field" strength for the user interaction on the audio object properties and parameters which starts at perimeter 100. Different modification parameters may have different effective distance parameters or respond differently to a common effective distance parameter. The distance is relative to the location of the audio object in the rendered space. It may be defined in terms of direction. For example, the effective distance may differ depending on which direction the user interaction is. Thus, there may be X-Y-Z components for the effective distance. The local coordinates are preferably based on the audio object size and rotation properties. In some embodiments, it may be desirable to define a more complex shape for the effective distance parameter.

Figure 10A:
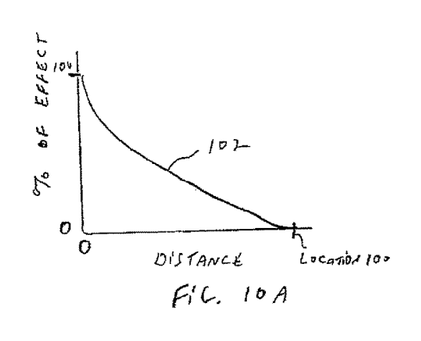
FIGS. 10A-10B are diagrams illustrating example field strengths for an effective distance parameter.
Figure 10B:
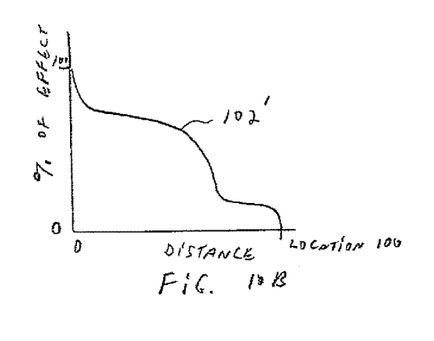

As illustrated by FIG. 10A, the shape of an effect curve 102 may be defined as a function of the above distance. Thus, the effect may for example ease-in, as the interaction begins, grow stronger as the user moves deeper into the effective area, and ease-out to full effect as the user moves closer to the origin of the audio object. While the effective distance is desired to detect and indicate the interaction, it may be useful to have different effective distances for different modifying parameters. Therefore, a modificator of the effective distance parameter may be defined for each parameter. FIG. 10A might illustrate the effect of the effective distance parameter on a modification parameter in only one direction from the audio object. FIG. 10B might illustrate the effect curve 102' of the effective distance parameter on a modification parameter in a different second direction from the audio object. The above description has been in regard to the modification adjustment parameter (the effective distance parameter in this case) influencing the effect of one of the modification parameters. However, the effect may be on the audio object itself; not directly on the modification parameter. In other words, the effect on the audio object may not necessarily be organized via a parameterized computation.

Reversibility

A reversibility modification parameter, even though considered a modification adjustment parameter, may also be considered a core parameter, and may define the reversibility of the interaction response. After a user interaction modifies the rendering of the audio object, the user interaction may subsequently be removed (i.e., the position of the rendering again changes). The audio object may either keep its new modified state or return to its original, "intended" state. The reversibility parameter describes the tendency of the audio object to undergo this passive modification.

In some embodiments, reversibility may be a secondary parameter of another parameter (or like described above for the Effective distance parameter, a further sub-modificator may be used). For example, if the size and location in space of an audio object have been modified through a user interaction, the removal of the user interaction may result in maintaining of the former modified property (e.g., parameter value 0) with the latter modified property being changed to its original state (e.g., a positive parameter value). The parameter is, thus, like hysteresis; specifying the speed of this change.

It is noted that what is called the original state above may not be the state from which the modification took place. This is because the underlying state of the audio object may vary, such as a function of the time for example. Therefore, the removal of the user interaction may also lead to a secondary user interaction and modification of the same audio object. This may be controlled by the interaction detection based on the effective distance and reversibility in order to smoothly modify the rendering.

Figure 11:
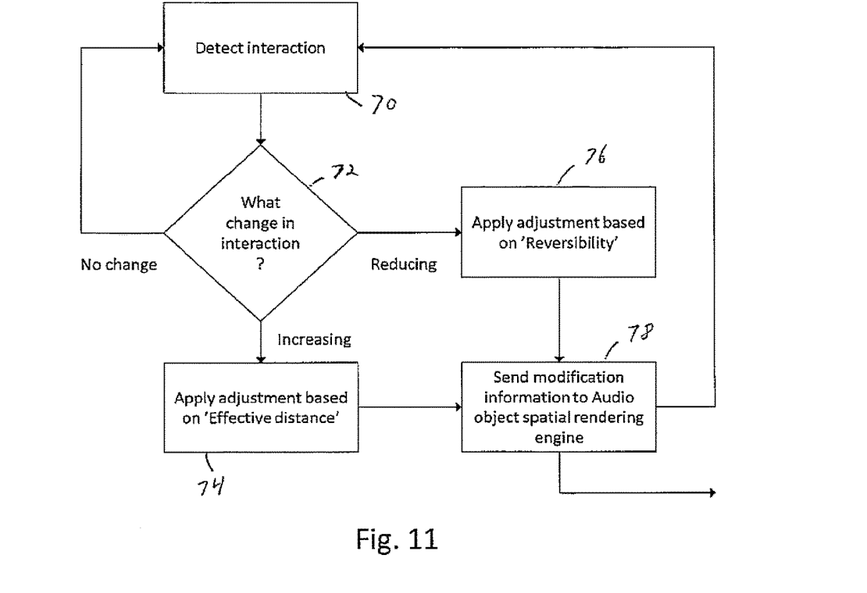
FIG. 11 is a diagram illustrating an example method.

The parameters above may be used to adjust the modification parameters as utilized by the 'Audio object spatial modification engine'. FIG. 11 presents the overall process. Based upon a detection interaction 70, a determination is made regarding what change in interaction is made as indicated by block 72. Interaction may be increased as indicated by block 74, such as applying an adjustment based upon an effective distance. Interaction may be decreased as indicated by block 76, such as applying an adjustment based upon reversibility. As indicated by block 78, modification information may then be sent to the audio object spatial rendering engine. At least in some embodiments, a new adjustment may be whichever is the more significant between a previous adjustment and a proposed new adjustment. For example, the new adjustment may be whichever is the more significant between the output from block 74 or the output from block 76; as decided based on block 72.

Features as described herein may enable building a system for natural responses in free-viewpoint audio. Features as described herein may allow for intuitive user interaction with various different audio objects. Features as described herein may enable new tools and opportunities in content creation leading to above advantages and content and product differentiation.

Figure 12:
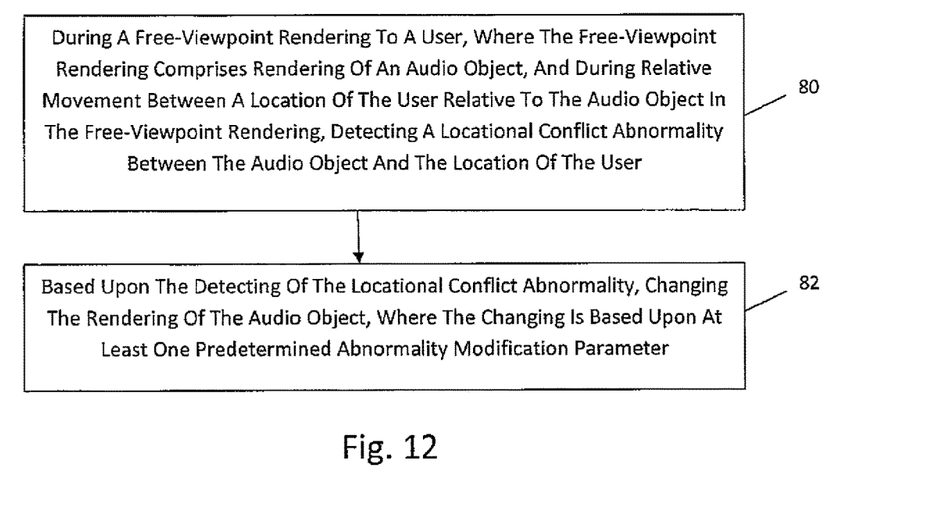
FIG. 12 is a diagram illustrating an example method.

Referring also to FIG. 12, in accordance with an example method, a method comprises, as indicated by block 80, during a free-viewpoint rendering to a user, where the free-viewpoint rendering comprises rendering of an audio object, and during relative movement between a location of the user relative to the audio object in the free-viewpoint rendering, detecting a locational conflict abnormality between the audio object and the location of the user; and based upon the detecting of the locational conflict abnormality, changing the rendering of the audio object, where the changing is based upon at least one predetermined abnormality modification parameter as indicated by block 82.

The changing may comprise at least one of size, location, scale, rotation and amplification of the audio object. The changing may comprise at least one of equalization, directiveness, time shift, stickiness and audio object multiplication. The free-viewpoint rendering may comprise a rendering of a second audio object, and, detecting a second locational conflict abnormality between the second audio object in the free-viewpoint rendering and the location of the user relative to the second audio object in the free-viewpoint rendering; and based upon the detecting of the second locational conflict abnormality, changing the rendering of the second audio object, where the changing of the rendering of the second audio object is based upon at least one different predetermined abnormality modification parameter. The at least one predetermined abnormality modification parameter may comprise at least two of the predetermined abnormality modification parameters. The method may further comprise, based upon the audio object, altering effect by the at least one predetermined abnormality modification parameter on the changing to the rendering of the audio object by a modification adjustment. The modification adjustment may apply a time interval and/or scale change to the at least one predetermined abnormality modification parameter. The modification adjustment may be an effective distance modification adjustment regarding distance between the audio object in the free-viewpoint rendering and a location of the user relative to the audio object in the free-viewpoint rendering. The modification adjustment may be a reversibility modification adjustment based upon subsequently detecting at least partial removal of the locational conflict abnormality. The method may further comprise selecting the at least one predetermined abnormality modification parameter based upon a type of the locational conflict abnormality detected. The method may further comprise selecting a value for the selected at least one predetermined abnormality modification parameter based upon a feature of the locational conflict abnormality detected. Detecting of the locational conflict abnormality may comprise using rendering position tracking. Detecting of the locational conflict abnormality may further comprise using head tracking of a head of the user. The relative movement may comprise a first location of the user in the free-viewpoint rendering changing to a second different location of the user in the free-viewpoint rendering, where the locational conflict abnormality is between the audio object and the second location of the user in the free-viewpoint rendering. In one example, the user location in the free-viewpoint rendering might not change; it could be the location of the audio object which changes while the location of the user in the viewpoint rendering is substantially unchanged. For example one of the bees shown in FIG. 4 might fly into the user's head (perhaps into the user's mouth or not through the user's mouth), but the user's head might otherwise be stationary in the rendering. There might be a rendering in which the user should have moved in view of what was happening in the rendering, but the location of the user in the rendering did not change and, thus, the movement of the audio object in the rendering without an expected movement of the user in the rendering has caused the locational conflict abnormality. For example, if lava is moving in the rendering and the user does not move out of the way of the lava (or out of the way quick enough as would be expected in real life), the locational conflict abnormality may be caused by the lava's movement relative to the user's location in the rendering. With features as described herein, potential locational conflict abnormalities between a user's location in a free-viewpoint rendering and the location of an audio object may be accommodated in a more meaningful and useful way for the user to experience an event outside normal defined movements or relative locations.

In accordance with an example embodiment, an apparatus may be provided comprising: at least one processor; and at least one non-transitory memory including computer program code, the at least one memory and the computer program code configured to, with the at least one processor, cause the apparatus to: during a free-viewpoint rendering to a user, where the free-viewpoint rendering comprises a rendering of an audio object, and during relative movement between a location of the user relative to the audio object in the free-viewpoint rendering, detect a locational conflict abnormality between the audio object and the location of the user; and based upon the detecting of the locational conflict abnormality, change the rendering of the audio object, where the changing is based upon at least one predetermined abnormality modification parameter.

The change may comprise at least one of size, location, scale, rotation and amplification of the audio object. The change may comprise at least one of equalization, directiveness, time shift, stickiness and audio object multiplication. The free-viewpoint rendering may comprise a rendering of a second audio object, the at least one memory and the computer program code are configured to, with the at least one processor, cause the apparatus to detect a second locational conflict abnormality between the second audio object in the free-viewpoint rendering and the location of the user relative to the second audio object in the free-viewpoint rendering; and based upon the detecting of the second locational conflict abnormality, change the rendering of the second audio object, where the changing of the rendering of the second audio object is based upon at least one different predetermined abnormality modification parameter. The at least one predetermined abnormality modification parameter may comprise at least two of the predetermined abnormality modification parameters. The at least one memory and the computer program code may be configured to, with the at least one processor, cause the apparatus to, based upon the audio object, alter effect by the at least one predetermined abnormality modification parameter on the changing to the rendering of the audio object by a modification adjustment. The modification adjustment may be configured to apply a time interval and/or scale change to the at least one predetermined abnormality modification parameter. The modification adjustment may be an effective distance modification adjustment regarding distance between the audio object in the free-viewpoint rendering and a location of the user relative to the audio object in the free-viewpoint rendering. The modification adjustment may be a reversibility modification adjustment based upon subsequently detecting at least a partial removal of the locational conflict abnormality.

In accordance with an example embodiment a non-transitory program storage device may be provided, readable by a machine, tangibly embodying a program of instructions executable by the machine for performing operations, the operations comprising: during a free-viewpoint rendering to a user, where the free-viewpoint rendering comprises a rendering of an audio object, and during relative movement between a location of the user relative to the audio object in the free-viewpoint rendering, detecting a locational conflict abnormality between the audio object and the location of the user; and based upon the detecting of the locational conflict abnormality, changing the rendering of the audio object, where the changing is based upon at least one predetermined abnormality modification parameter.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In accordance with an example embodiment, an apparatus may be provided comprising, during a free-viewpoint rendering to a user, where the free-viewpoint rendering comprises rendering of an audio object, and during relative movement between a location of the user relative to the audio object in the free-viewpoint rendering, means for detecting a locational conflict abnormality between the audio object and the location of the user; and based upon the detecting of the locational conflict abnormality, means for changing the rendering of the audio object, where the changing is based upon at least one predetermined abnormality modification parameter.

Figure 13:
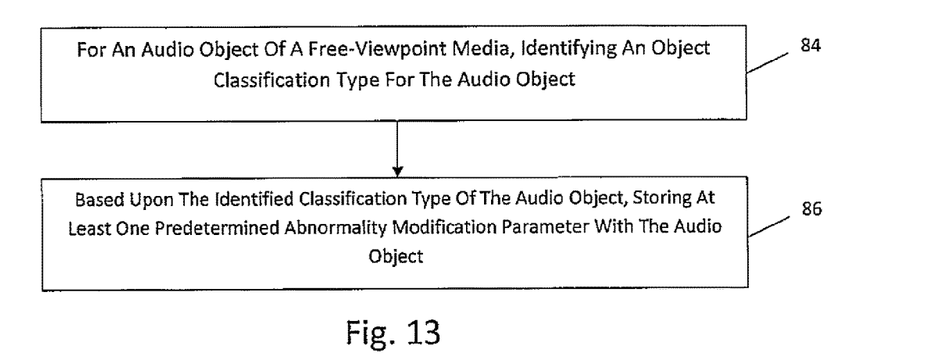
FIG. 13 is a diagram illustrating an example method.

Referring also to FIG. 13, in accordance with one example method, a method may be provided comprising, for an audio object of a free-viewpoint media, identifying an object classification type for the audio object as indicated by block 84; and based upon the identified classification type of the audio object, storing at least one predetermined abnormality modification parameter with the audio object as indicated by block 86.

In accordance with another example, an example apparatus may comprise at least one processor; and at least one non-transitory memory including computer program code, the at least one memory and the computer program code configured to, with the at least one processor, cause the apparatus to: for an audio object of a free-viewpoint media, allow identification of an object classification type for the audio object; and based upon the identified classification type of the audio object, store at least one predetermined abnormality modification parameter with the audio object.

In accordance with another example, an example apparatus may comprise a non-transitory program storage device readable by a machine, tangibly embodying a program of instructions executable by the machine for performing operations, the operations comprising: for an audio object of a free-viewpoint media, identifying an object classification type for the audio object; and based upon the identified classification type of the audio object, storing at least one predetermined abnormality modification parameter with the audio object.

Figure 14:
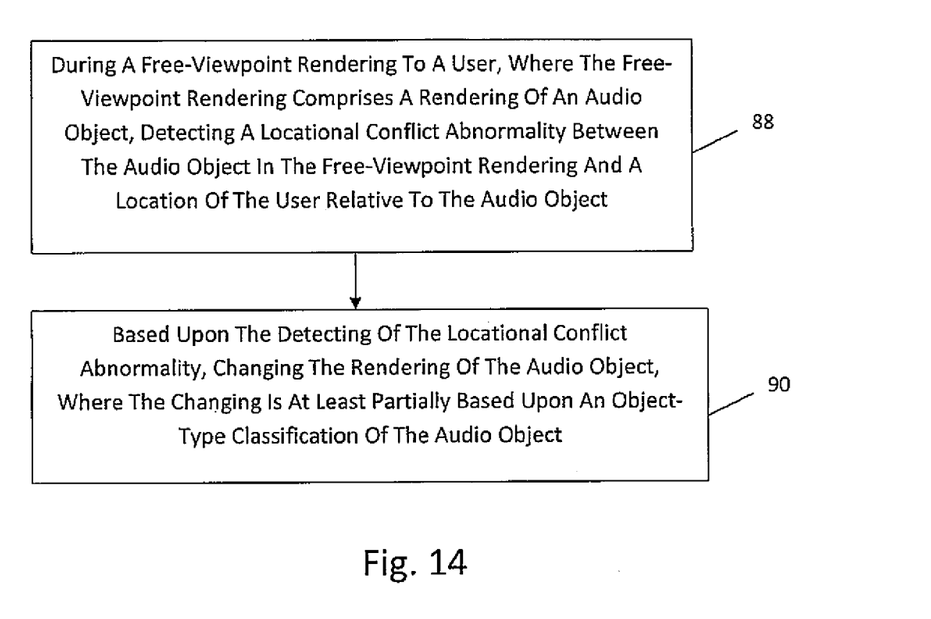
FIG. 14 is a diagram illustrating an example method.

Referring also to FIG. 14, in accordance with one example method, a method may be provided comprising, during a free-viewpoint rendering to a user, where the free-viewpoint rendering comprises a rendering of an audio object, detecting a locational conflict abnormality between the audio object in the free-viewpoint rendering and a location of the user relative to the audio object as indicated by block 88; and based upon the detecting of the locational conflict abnormality, changing the rendering of the audio object, where the changing is at least partially based upon an object-type classification of the audio object as indicated by block 90.

In accordance with another example, an example apparatus may comprise at least one processor; and at least one non-transitory memory including computer program code, the at least one memory and the computer program code configured to, with the at least one processor, cause the apparatus to: during a free-viewpoint rendering to a user, where the free-viewpoint rendering comprises a rendering of an audio object, detect a locational conflict abnormality between the audio object in the free-viewpoint rendering and a location of the user relative to the audio object; and based upon the detecting of the locational conflict abnormality, change the rendering of the audio object, where the changing is at least partially based upon an object-type classification of the audio object.

In accordance with another example, an example apparatus may comprise a non-transitory program storage device readable by a machine, tangibly embodying a program of instructions executable by the machine for performing operations, the operations comprising: during a free-viewpoint rendering to a user, where the free-viewpoint rendering comprises a rendering of an audio object, detecting a locational conflict abnormality between the audio object in the free-viewpoint rendering and a location of the user relative to the audio object; and based upon the detecting of the locational conflict abnormality, changing the rendering of the audio object, where the changing is at least partially based upon an object-type classification of the audio object.

Figure 15:
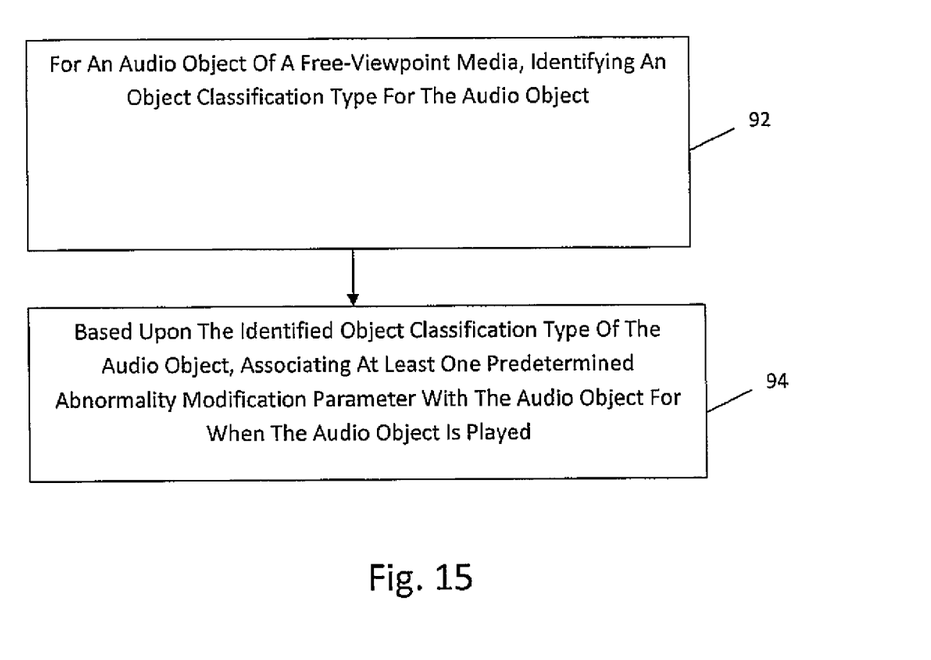
FIG. 15 is a diagram illustrating an example method.

Referring also to FIG. 15, in accordance with another example method, a method may be provided comprising, for an audio object of a free-viewpoint media, identifying an object classification type for the audio object as indicated by block 92; and based upon the identified object classification type of the audio object, associating at least one predetermined abnormality modification parameter with the audio object for when the audio object is played as indicated by block 94.

In accordance with another example, an example apparatus may comprise at least one processor; and at least one non-transitory memory including computer program code, the at least one memory and the computer program code configured to, with the at least one processor, cause the apparatus to: for an audio object of a free-viewpoint media, identify an object classification type for the audio object; and based upon the identified object classification type of the audio object, associate at least one predetermined abnormality modification parameter with the audio object for when the audio object is played.

In accordance with another example, an example apparatus may comprise a non-transitory program storage device readable by a machine, tangibly embodying a program of instructions executable by the machine for performing operations, the operations comprising: for an audio object of a free-viewpoint media, identifying an object classification type for the audio object; and based upon the identified object classification type of the audio object, associating at least one predetermined abnormality modification parameter with the audio object for when the audio object is played.

A first feature as described herein relates to the definition and detection of interactions in the context of free-viewpoint audio objects. Additionally, it relates to defining the extent of a parameter modification based on the interaction. A second feature as described herein relates to the actual parameter modification and how that affects the rendering of the audio object. The first feature may be used as an enabler technology for solving a problem in regard to locational abnormalities. These features may be used to create a system that provides an end-to-end solution where content producers will have control over how users may interact with the audio objects and how the rendering can be accordingly achieved. With features as described herein, a desire may be fulfilled that something needs to happen when a user comes in contact with an audio object; in order to create a believable experience. This is basically an indirect or involuntary interaction. The results may generally be "natural" and "believable". This is not merely customizing audio effects that are associated to a geo-location. Features as described herein may be used with fully free-viewpoint audio and for modification of a "single" audio object; not merely combining audio objects.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
during a free-viewpoint rendering to a user, where the free-viewpoint rendering comprises rendering of an audio object in a reality content consumption space configured to allow movement of the user relative to the audio object, and during relative movement between a location of the user in the free-viewpoint rendering and the audio object in the free-viewpoint rendering, detecting a locational conflict abnormality between the audio object and the location of the user in the free-viewpoint rendering, wherein an audio object modification is configurable to be applied to an audio object interaction between the user and the audio object based upon the locational conflict abnormality; and
based upon the detecting of the locational conflict abnormality, changing the rendering of the audio object to apply the audio object modification, where the changing is based upon at least one predetermined abnormality modification parameter.

2. A method as in claim 1 where the changing comprises at least one of size, location, scale, rotation and amplification of the audio object.

3. A method as in claim 1 where the changing comprises at least one of equalization, directiveness, time shift, stickiness and audio object multiplication.

4. A method as in claim 1 where the free-viewpoint rendering comprises a rendering of a second audio object, and detecting a second locational conflict abnormality between the second audio object in the free-viewpoint rendering and the location of the user in the free-viewpoint rendering; and based upon the detecting of the second locational conflict abnormality, changing the rendering of the second audio object, where the changing of the rendering of the second audio object is based upon at least one different predetermined abnormality modification parameter.

5. A method as in claim 1 where the at least one predetermined abnormality modification parameter comprises at least two of the predetermined abnormality modification parameters.

6. A method as in claim 1 further comprising, based upon the audio object, applying an altering effect by the at least one predetermined abnormality modification parameter on the changing to the rendering of the audio object by a modification adjustment.

7. A method as in claim 6 where the modification adjustment applies a time interval and/or scale change to the at least one predetermined abnormality modification parameter.

8. A method as in claim 6 where the modification adjustment is an effective distance modification adjustment regarding distance between the audio object in the free-viewpoint rendering and the location of the user in the free-viewpoint rendering.

9. A method as in claim 6 where the modification adjustment is a reversibility modification adjustment based upon subsequently detecting at least partial removal of the locational conflict abnormality.

10. A method as in claim 1 further comprising selecting the at least one predetermined abnormality modification parameter based upon a type of the locational conflict abnormality detected.

11. A method as in claim 10 further comprising selecting a value for the selected at least one predetermined abnormality modification parameter based upon a feature of the locational conflict abnormality detected.

12. A method as in claim 1 where the detecting of the locational conflict abnormality comprises using rendering position tracking.

13. A method as in claim 12 where the detecting of the locational conflict abnormality further comprises using head tracking of a head of the user.

14. A method as in claim 1 where the relative movement comprises a first location of the user in the free-viewpoint rendering changing to a second different location of the user in the free-viewpoint rendering, where the locational conflict abnormality is between the audio object and the second location of the user in the free-viewpoint rendering.

15. An apparatus comprising:
at least one processor; and
at least one non-transitory memory including computer program code, the at least one memory and the computer program code configured to, with the at least one processor, cause the apparatus to:
during a free-viewpoint rendering to a user, where the free-viewpoint rendering comprises a rendering of an audio object in a reality content consumption space configured to allow movement of the user relative to the audio object, and during relative movement between a location of the user in the free-viewpoint rendering and the audio object in the free-viewpoint rendering, detect a locational conflict abnormality between the audio object and the location of the user in the free-viewpoint rendering, wherein an audio object modification is configurable to be applied to an audio object interaction between the user and the audio object based upon the locational conflict abnormality; and
based upon the detecting of the locational conflict abnormality, change the rendering of the audio object to apply the audio object modification, where the changing is based upon at least one predetermined abnormality modification parameter.

16. An apparatus as in claim 15 where the change comprises at least one of size, location, scale, rotation and amplification of the audio object.

17. An apparatus as in claim 15 where the change comprises at least one of equalization, directiveness, time shift, stickiness and audio object multiplication.

18. An apparatus as in claim 15 where the free-viewpoint rendering comprises a rendering of a second audio object, the at least one memory and the computer program code are configured to, with the at least one processor, cause the apparatus to detect a second locational conflict abnormality between the second audio object in the free-viewpoint rendering and the location of the user relative to the second audio object in the free-viewpoint rendering; and based upon the detecting of the second locational conflict abnormality, change the rendering of the second audio object, where the changing of the rendering of the second audio object is based upon at least one different predetermined abnormality modification parameter.

19. An apparatus as in claim 15 where the at least one predetermined abnormality modification parameter comprises at least two of the predetermined abnormality modification parameters.

20. An apparatus as in claim 15 where the at least one memory and the computer program code are configured to, with the at least one processor, cause the apparatus to, based upon the audio object, apply an altering effect by the at least one predetermined abnormality modification parameter on the changing to the rendering of the audio object by a modification adjustment.

21. An apparatus as in claim 20 where the modification adjustment is configured to apply a time interval and/or scale change to the at least one predetermined abnormality modification parameter.

22. An apparatus as in claim 20 where the modification adjustment is an effective distance modification adjustment regarding distance between the audio object in the free-viewpoint rendering and the location of the user relative to the audio object in the free-viewpoint rendering.

23. An apparatus as in claim 20 where the modification adjustment is a reversibility modification adjustment based upon subsequently detecting at least partial removal of the locational conflict abnormality.

24. A non-transitory program storage device readable by a machine, tangibly embodying a program of instructions executable by the machine for performing operations, the operations comprising:
during a free-viewpoint rendering to a user, where the free-viewpoint rendering comprises a rendering of an audio object in a reality content consumption space configured to allow movement of the user relative to the audio object, and during relative movement between a location of the user in the free-viewpoint rendering and the audio object in the free-viewpoint rendering, wherein an audio object modification is configurable to be applied to an audio object interaction between the user and the audio object based upon the locational conflict abnormality, detecting a locational conflict abnormality between the audio object and the location of the user in the free-viewpoint rendering; and
based upon the detecting of the locational conflict abnormality, changing the rendering of the audio object to apply the audio object modification, where the changing is based upon at least one predetermined abnormality modification parameter.

* * * * *